US006704906B1

(12) United States Patent
Yankovich et al.

(10) Patent No.: US 6,704,906 B1
(45) Date of Patent: Mar. 9, 2004

(54) SELF-DIRECTED ROUTABLE ELECTRONIC FORM SYSTEM AND METHOD

(75) Inventors: Steve Yankovich, San Jose, CA (US); Nathan Hoover, Los Gatos, CA (US); Ed Porter, Menlo Park, CA (US)

(73) Assignee: Movaris, Inc., Campbell, CA (US)

( * ) Notice: Subject to any disclaimer, the term of this patent is extended or adjusted under 35 U.S.C. 154(b) by 0 days.

(21) Appl. No.: 09/281,147

(22) Filed: Mar. 27, 1999

(51) Int. Cl.[7] ............................................. G06F 17/00
(52) U.S. Cl. ...................................................... 715/505
(58) Field of Search ................................ 707/505, 506, 707/507, 508, 516; 715/505, 506, 507, 508, 576

(56) References Cited

U.S. PATENT DOCUMENTS

| | | | | |
|---|---|---|---|---|
| 5,410,646 A | * | 4/1995 | Tondevold et al. | ......... 715/507 |
| 5,465,299 A | * | 11/1995 | Matsumoto et al. | ........ 713/176 |
| 5,634,064 A | | 5/1997 | Warnock et al. | |
| 5,704,045 A | * | 12/1997 | King et al. | ..................... 705/35 |
| 5,797,133 A | * | 8/1998 | Jones et al. | ..................... 705/35 |
| 5,862,223 A | * | 1/1999 | Walker et al. | .................. 705/1 |
| 5,953,523 A | * | 9/1999 | Martinez et al. | ............ 345/853 |
| 5,953,528 A | * | 9/1999 | Sullivan | ...................... 707/100 |
| 6,070,177 A | * | 5/2000 | Kao et al. | ...................... 707/10 |
| 6,084,558 A | | 7/2000 | Kraft et al. | |
| 6,084,585 A | | 7/2000 | Kraft et al. | |
| 6,137,488 A | | 10/2000 | Kraft et al. | |
| 6,192,381 B1 | * | 2/2001 | Stiegemeier et al. | ........ 707/505 |
| 6,253,323 B1 | * | 6/2001 | Cox et al. | .................... 713/168 |
| 6,256,614 B1 | * | 7/2001 | Wecker et al. | ............... 713/151 |
| 6,272,485 B1 | * | 8/2001 | Sragner | .......................... 707/1 |
| 6,272,506 B1 | | 8/2001 | Bell | |
| 6,279,042 B1 | * | 8/2001 | Ouchi | .......................... 705/51 |
| 6,295,536 B1 | * | 9/2001 | Sanne | .......................... 707/10 |
| 6,314,415 B1 | | 11/2001 | Mukherjee | |
| 6,360,254 B1 | * | 3/2002 | Linden et al. | ............... 709/219 |
| 6,587,841 B1 | * | 7/2003 | DeFrancesco et al. | ........ 705/38 |

OTHER PUBLICATIONS

Mathews et al., "Electronic Management of the Peer Review Process" May 6–10, 1996, http://www5conf.inria.fr/fich__html/papers/P55/Overview.html, pp. 1–21.*
Pope et al., "Using the web for peer review and publication of scientific journals" Sep. 1998, http://www.consecol.org/Journal/consortium.html, pp. 1–10.*
Compton, Michael M. et al., "Intelligent Validation and Routing of Electronic Forms in a Distributed Workflow Environment" IEE 1994, pp. 125–131.*

* cited by examiner

*Primary Examiner*—Stephen S. Hong
*Assistant Examiner*—Doug Hutton
(74) *Attorney, Agent, or Firm*—Blakely, Sokoloff, Taylor & Zafman LLP (57) ABSTRACT

This invention provides for a self-directed routable electronic form generation system and method where each user in the process defines the next, or all the subsequent user routing. The invention resides in providing rules and guidelines that define routing to exist completely within the electronic form itself. Residing in the electronic form these routing rules are dynamically changed based on data input to the form, providing visual clues to the routing based on that input. The present invention generates in the approver's view of the form appropriate visual elements corresponding with allowable actions of this subsequent viewer. The present invention also provides visual clues as to the next routing destination based on the electronics form current fill-in data, or based on any changes the approver makes to fill-in data, all without server interaction. This sequence continues until the electronics "form flow" is complete and an end point is reached.

33 Claims, 9 Drawing Sheets

NON-VISUAL PROGRAMMATIC ELEMENTS

SHOW OR HIDE SIGNATURE LINE & LABEL BASED ON VALUE OF NUMERIC FIELD

```
function ShowSig() {
    var da = this.getField("dollar.amount");
    var li = this.getField("director.signature.line");
    var la = this.getField("director.signature.line.label");

if (da.value > 2000) {
        li.hidden = false;
        la.hidden = false;
    }
    else {
        li.hidden = true;
        la.hidden = true;
    }
}
ShowSig();
```

SELF-DIRECTED ROUTABLE ELECTRONIC FORM SYSTEM AND METHOD

FIELD OF INVENTION

Invention relates to methods and means for conveying electronically visual and graphically displayable user data over a server, and more particularly to electronically displayable forms containing user provided information over a server network.

BACKGROUND OF INVENTION

Traditionally software applications and architectures that accommodate the form flow of electronic forms use server-side programs to determine the processing, or routing, of a given form. These approaches use data and tables stored separately from the electronic form itself to define a set of rules and routing guidelines. In these approaches the server-side program will interpret some data from the electronic form submitted from the client and then using these server-side routing guidelines will perform some task to process the electronic form. An example of this can be found in Jet-Forms use of what are called roles which are defined using a special software application (separate from the electronic form) called the InTempo Role Builder (defined in white paper http://www.jetform.com/prodsol/whitepapers/intempo_ps.html). These approaches require that all possible routing scenarios are defined ahead of time and that all users within a user community have their roles within those scenarios defined. This pre-defined routing strategy requires a large amount of data that would prohibit inclusion in the electronic form that would be transmitted from one user to another over the server.

SUMMARY OF INVENTION

The invention permits a Self-Directed electronic form that can guide the user to appropriate routing based on data input on the form all without interaction with a server side application. As the user inputs data into the electronic form, displayed in a viewer (such as a Web browser) visual and non-visual programmatic elements in the form will change based on the data input and provide visual guidance to the user as to where the form should be routed. This Self-Directed electronic form uses the client machine's processor to interpret input data on the electronic form and execute programmatic elements within the electronic form. Upon user completing the electronic form, the present invention provides a means to visually guide (without server interaction) the user, or submitter, of the electronic form to provide a server side application in preparing the form for the next user. The electronic form is then routed to the next user(s) via that server side application using electronic messaging to provide a link to the filled-in electronic form submitted by the previous user. The next user, or approver, then displays the electronic form in a viewer, such as a Web browser. The present invention generates in the approver's view of the form appropriate visual elements corresponding with allowable actions of this subsequent viewer. The present invention also provides visual clues as to the next routing destination based on the electronics form current fill-in data, or based on any changes the approver makes to fill-in data, all without server interaction. This sequence continues until the electronics "form flow" is complete and an end point is reached.

DETAILED DESCRIPTION OF PREFERRED EMBODIMENT(S)

Figure 1:
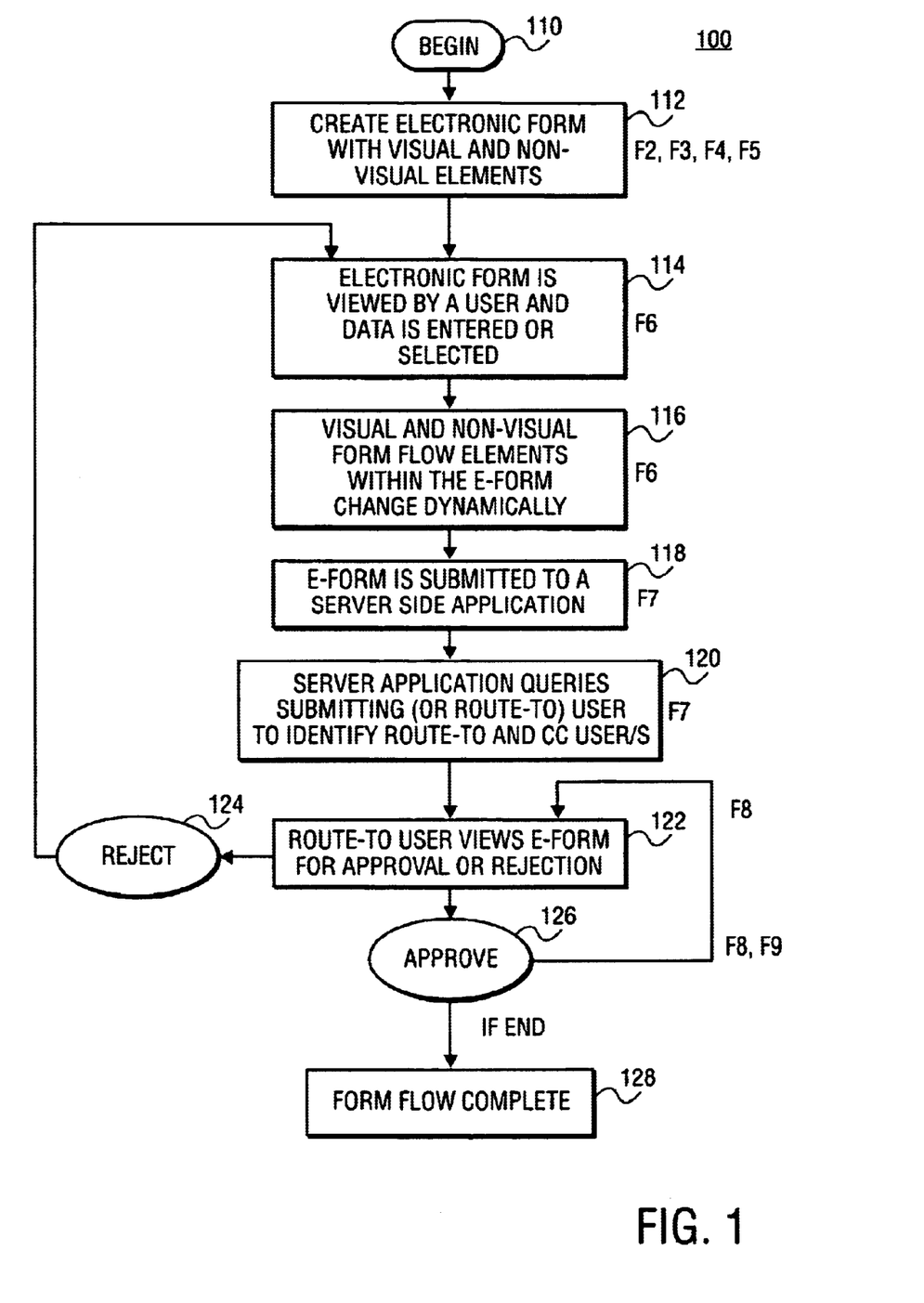
FIG. 1 is a flow diagram of the creation of a self-directed routable electronic form through the automated use of that electronic form in accordance with the present invention.

FIG. 1 illustrates a flow diagram of self-directed routable electronic form system 100 provided in accordance with the principles of this invention. The significant steps of this flow are further detailed in FIGS. 2–9. As shown in FIG. 1, the present invention permits a self-directed routable electronic form that can guide the user to appropriate routing based on data input on the form without interaction with a server side application. Once invoked to start in step 110, self-directed electronic form system 100 begins to create an electronic form (E-Form), the form generation to be described in further details with reference to FIGS. 2–5. Once created, self-directed electronic form system 100 then in step 114 displays that created form in a viewer, such as a Web browser, thus allowing the user to provide data input to the form. Then in step 116, visual and non-visual programmatic elements of the form are changed in response to receiving user data. In step 118, the completed form is submitted to the server-side application, and then in step 120, visual guidance is provided to the user regarding where the form should be routed using the processor of the user's machine to interpret user input data. In step 122, server side application then routes the form to a subsequent user for that user's data entries, such as additional data input, or user approvals or rejections, using electronic messaging to provide a link to the filled-in electronic form submitted by the previous user. For example, in response to an user's rejection entry, the electronic form is routed back to step 114 to again request user data input. Otherwise, if the user approves the form in step 126, self-directed electronic form generation system 100 returns to step 122 for next user approval. The next user, or approver, then displays the electronic form in a viewer, such as a Web browser, and step 122 is repeated until all needed user approvals are received, and process ends in step 128.

Figure 2:
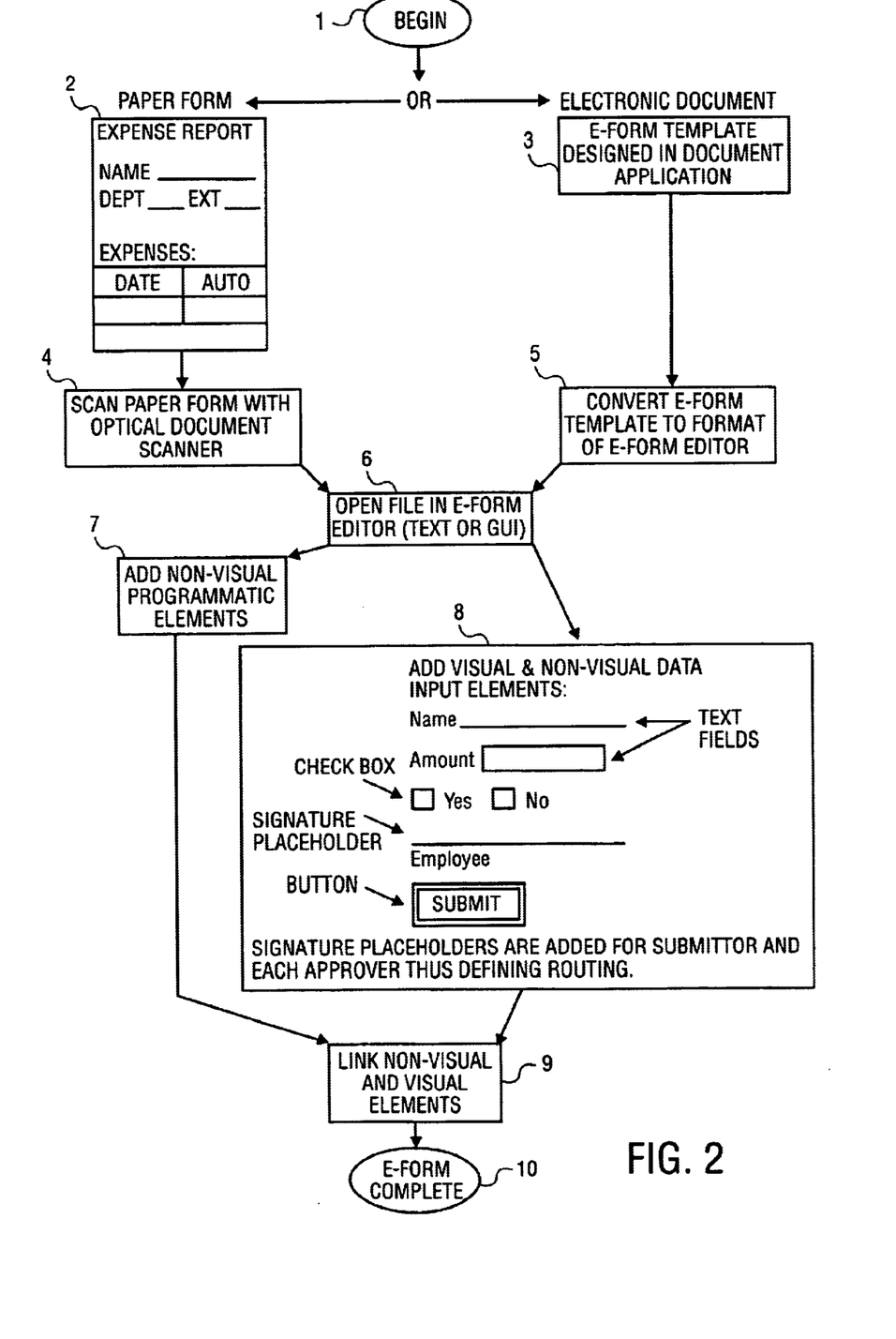
FIG. 2 is a block diagram illustrating the process of creating an electronic form of FIG. 1.
Figure 3:
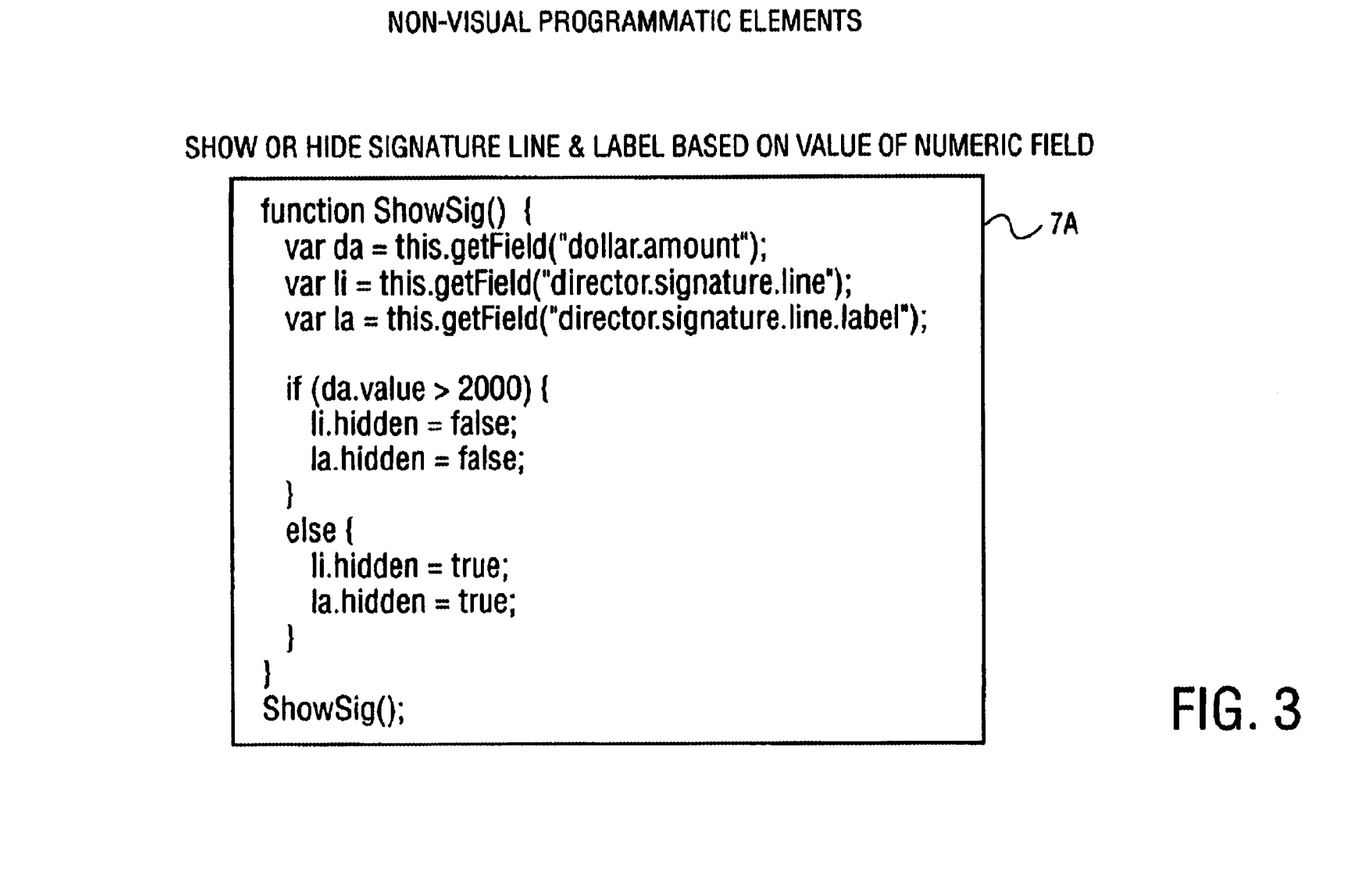
FIG. 3 is an example of a programmatic element added to the electronic form of FIG. 2.

FIG. 2 is a block diagram illustrating process 112 of creating an electronic form of FIG. 1. The present invention assumes the existence of an electronic file of some format (e.g. HTML, XML, Acrobat PDF, GIF, MS Word, etc.), that is a facsimile of a paper form 2. In step 3, an electronic file corresponding to form 2 may be created in a document editor/viewer, or be created in step 4 by scanning paper form 2 with an optical scanner. Scanning a document (form) can result in one of many binary image file formats (e.g. TIFF, JPEG, BMP, etc.) or directly into a format that allows native electronic form construction (e.g. Adobe's Acrobat PDF and Acrobat Form Tool). In step 5, applications such as Acrobat converts the electronic document, or image, formats to their native file format, wherein the source target electronic file format (E-form source) for the electronic form supports the inclusion of both visual elements and non-visual programmatic elements, thereby providing a form that can be both viewed and filled in on a computer screen. This E-form source may therefore be a computer language (e.g. HTML, XML, C++, etc.) and thus a text file, or a proprietary binary format that is accompanied by a specific viewer/editor (e.g. Adobe PDF and Acrobat). The E-form source would be opened in step 6 in a viewer/editor, suitable to the format of the file to "author" the visual and non-visual elements of the E-form. The E-form source also supports in step 7 the addition of non-visual programmatic elements. These programmatic elements are implemented, for example in FIG. 3, with a computer language script 7A, such as in, e.g. Java, JavaScript, HTML, XML, etc., and must be executable on a client machine (the machine user uses to view/complete the E-form), and accept data filled into electronic form 8 (FIG. 2), visual and non-visual data input elements on the E-form.

Figure 4:
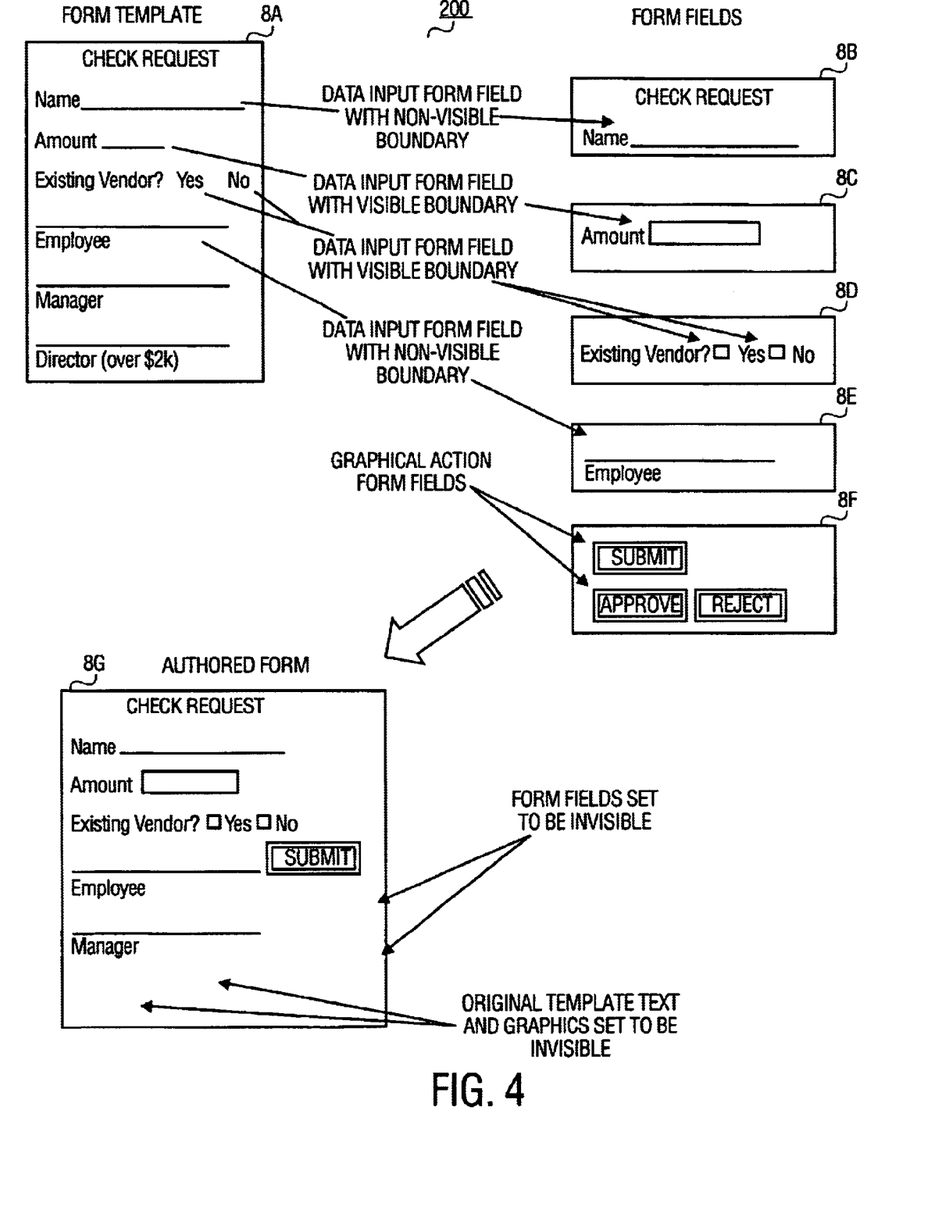
FIG. 4 is an illustration of various data input elements added to the electronic form.

FIG. 4 is an illustration of various data input elements added to the electronic form. As shown in FIG. 4, the E-form source of the present invention supports the addition of data input elements of form 8, which can also be referred to as form fields 8A–8G. Form fields 8A–8G mostly comprise data input form fields that allow the input of textual data 8B/8C/8E (e.g. names, dates, numbers, etc.). These text fields can have visual clues (e.g. underline, box, etc.), as on a paper form, so as to guide the user as to where data goes. Often these physical clues are part of the form template and so the boundary of the added form field is not visible. Text fields may also be accompanied by labels 8B–8F, which cannot be edited by the end user of the E-form. These labels are often part of the original form document, or template, but can also be added as form fields. Visual elements can also comprise graphical form fields, such as buttons 8F, 8D check boxes and list boxes. These graphical form fields can either cause an action (e.g. the execution of a non-visual programmatic element) or facilitate the selection of data (similar to textual entry but via interactive graphical selection). When all form fields to guide the user, and capture data, have been added to the E-form 8G, various form fields could have their visibility flags set such that they are not visible. These invisible form fields will be made visible based on data input, or actions initiated by other form fields, either by user input or by a server side application that processes E-form 8G.

Figure 5:
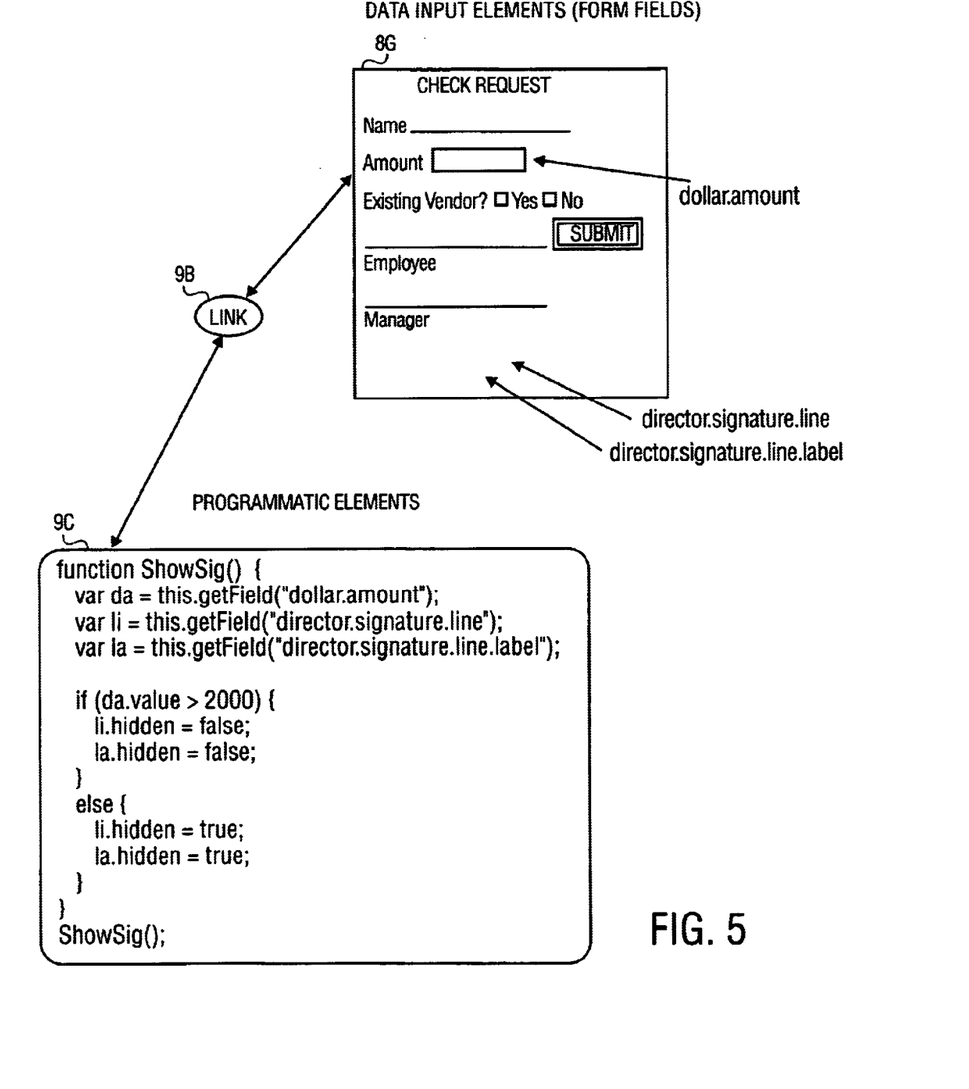
FIG. 5 is an illustration of the linking of a programmatic element with data input elements.

FIG. 4 illustrates a sample form generation and routing process 200 requiring a signature, or approval via visual elements, such as 8A–8G (form fields) that is commonly found on paper-based forms. It is common to find several signature lines on a paper-based form that signify the routing for signatures, or form flow, that will be required to process the form. In the case of the present invention these form fields that comprises signature lines (i.e., 8E) that are made visible based on generating non-visual programmatic elements process 9C (FIG. 5). Linking process 9B links these non-visual programmatic elements and the signature form fields such that the programmatic elements 9C uses input data from the various text and graphical fields to determine visibility state of form fields. A common business rule that determines the form flow (or signature routing) for a business form is a dollar amount 8C of FIG. 4 associated with the forms purpose. In the example form 8G, the value of the form field named dollar.amount is used in the programmatic element 9C to make visible the additional signature required for dollar amounts over $2k. The form fields director.signature.line and director.signature.line.label are made visible or invisible based on process 9C. All possible signature/ approval form fields are in E-form 8G, but the business rules coded into the programmatic elements process 9C will make visible some or all based on the data input to E-form 8G by the initial submitter, or subsequent route-to users of the E-form.

FIG. 5 is an illustration of the linking of a programmatic element with data input elements. Non-visual and visual elements linking process 9B provides a stand-alone E-form that dynamically changes both programmatic and visual elements based on form fill-in data all on the local client processor without communication with a server. Linking process 9B that provides the E-form with the ability to go through dynamic visual and non-visual elements changes can be done via implementation with browser supported languages (e.g. HTML and Java) or by a native application written in C or C++. Various E-Form file formats are provided, e.g. Acrobat PDF and HTML, to support linking process 9B and local client execution of programmatic elements. The present invention uses this ability along with the ability to make visual elements either visible or hidden to guide the routing of the E-form. The routing of the E-form in the present invention is self directed. That is to say, the user completing, or viewing, the form will take action to route the form based on visual clues provided on the form. The E-Form routing path is therefore flexible and dynamic. Once all items of E-form requiring user input have had form fields applied and all visual and non-visual elements are included, E-form authoring is completed (see back to step 10 of FIG. 2.) and can be made available to users.

Figure 6:
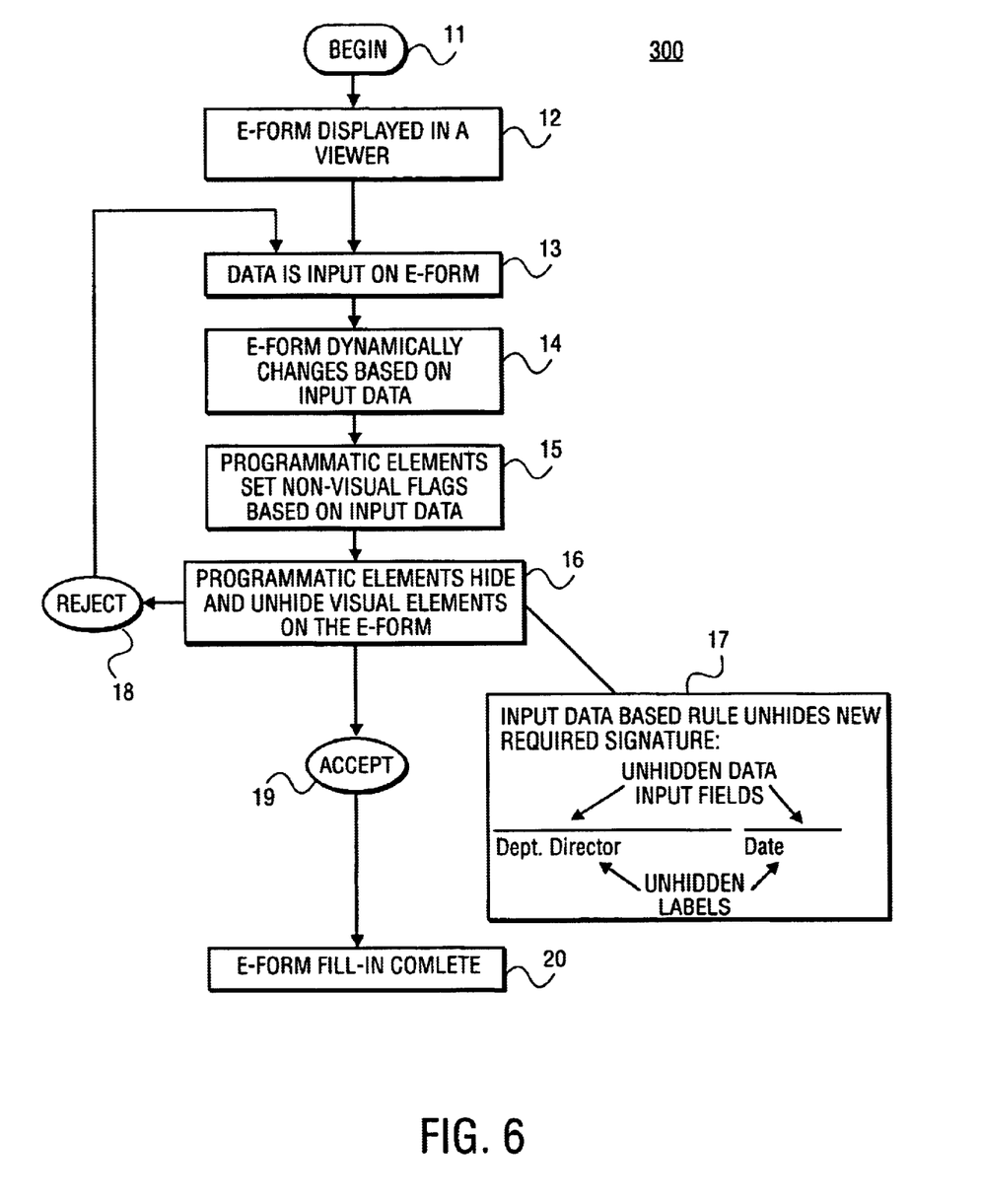
FIG. 6 is a flow diagram of data entry stage of a blank electronic form until the form is complete for submission to a routing process.

FIG. 6 is a flow diagram of the use, or fill-in, of a blank electronic form until the form is completed for submission to a routing process. FIG. 6 illustrates, in step 12, completely authored E-form 8G of FIG. 5 that is displayed in a viewer for an user to fill-in and submit the E-form to a server side application. For this purpose the E-form 8G is displayed in a viewer (e.g. Web browser, Adobe Acrobat) appropriate to the corresponding E-form file format (e.g. HTML, XML, Acrobat PDF). Data for E-form is provided in step 13 by the user entering text into form fields and by clicking on various graphical form fields (such as 8B–8F of FIG. 4). As data is entered/selected by the user on E-form 8G, step 14 invokes programmatic elements process 9C to dynamically change the visual appearance of E-form 8G. These visual changes to E-form 8G during fill-in help guide the user to correctly complete the fill-in. In step 15, the form fields representing approval signatures have non-visible visibility flags that are set based on this input data. As the E-form data completed takes place any entry of data into a field linked to a programmatic element will cause that program to execute, on the client machine, immediately, and in step 16, hide or expose visual elements of the form. These visual changes to E-form 8G may cause the user to change some of the data just entered thus in step 18 rejecting the current fill-in. The current invention is based on the E-form's self contained (without server interaction) ability to hide and expose approval signature graphical elements 17 (signature line, signature label, date line, and date label) which then guide the current user as to appropriate routing to subsequent users. Once all data has been input to the B-form, and thus all visual aspects of the form are acceptable to the current user, the E-form will be visually stable and the E-Form data entry stage considered complete in step 20.

Figure 7:
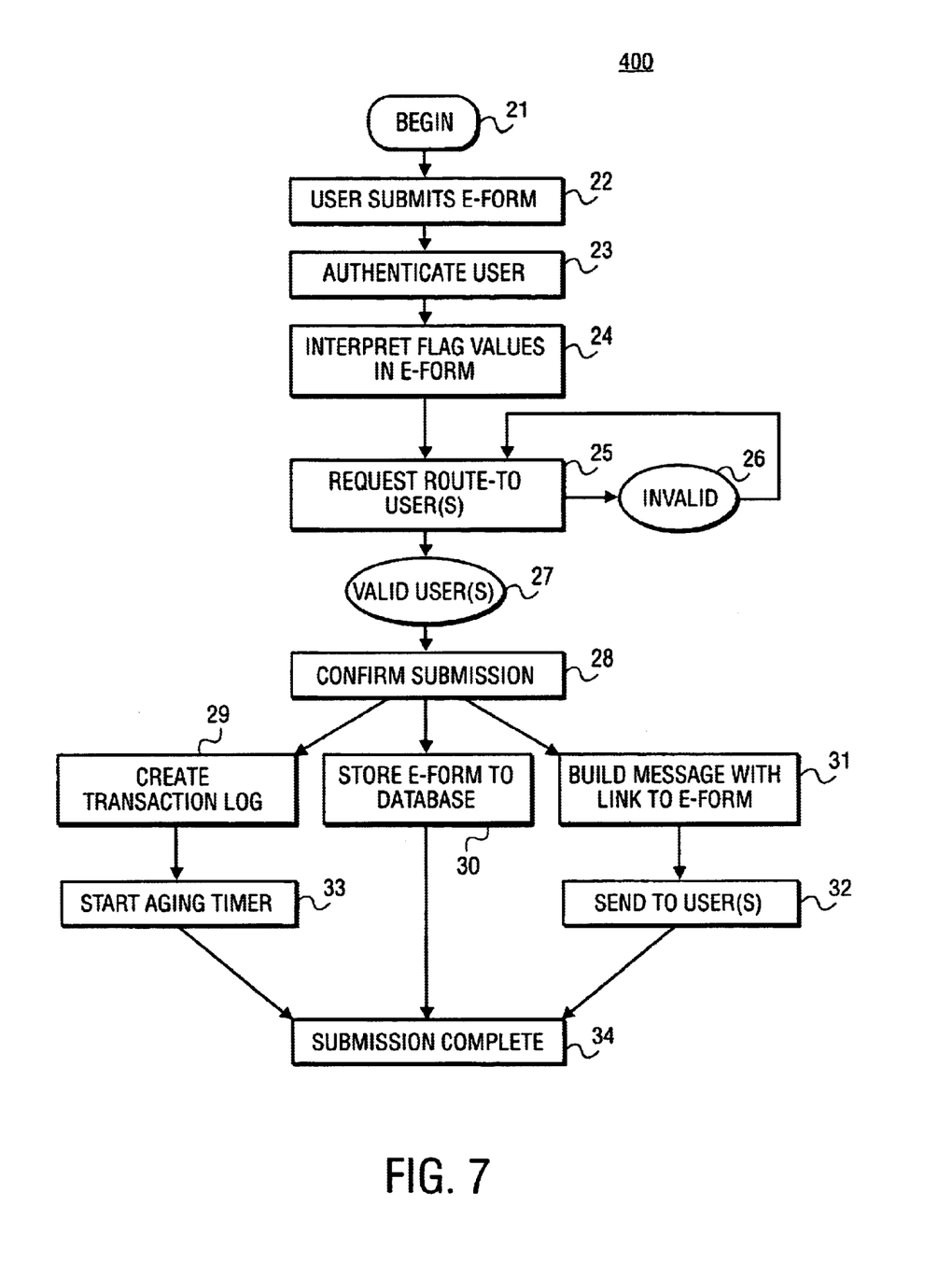
FIG. 7 is a flow diagram of a completed form's submission to a server based routing process.

FIG. 7 is a flow diagram of a completed form's submission process 400 to a server based routing by the server side application. With the E-form having it's data entry stage completed, a method for the submission of the completed data to a server side application 400 allows implementation of an electronic form flow, or routing of the E-form. In step 22, submission of data to a server side application is initiated such as via a graphical button labeled submit. In performing the 22 submit action, via clicking on this button, a programmatic element within the E-form will transmit a request to submit the completed data to a server side application. The transmission of this request, or data, to and from the E-form could be implemented with hypertext transfer protocol (HTTP) if the E-form is used from a Web browser. In this implementation the E-form element that submits a request, or data, to the server side application sends the request to a specific port of a server machine. On that server machine a Web server is listening to that port for requests. In the preferred implementation of the form flow server side application 400, step 23 requires user authentication by requesting an user id and an user password. This user authentication could be implemented by querying the user (via Web browser for user id and password with a submission action of this data once entered). With a valid user confirmed the server side application would then evaluate the submitted E-form fill-in data. Step 24 checks a set of visibility flags associated with approval signature elements, which would be interpreted by the server side application in order to build a table of the required routing.

The present invention uses a self-directed anonymous routing technique where the E-form contains the title (or other anonymous designator) of the users the form requires routing to in the form of signature form fields. These signature form fields have visibility flags signifying whether the fields are visible depending on the routed designee and based on the business rules in the linked programmatic elements. At this stage the server side application 300, as an example of an implementation, sends a request in step 25 to the submitting user to identify the next, or all subsequent, users to route to. The request to the submitting user, via HTTP and could be in the form of HTML or PDF, and can include the title (or other anonymous designator) providing sufficient description for the submitting user to provide the correct actual user names. The submitting user would provide user names, user ids, or some other designator, to this routing user request and submit this data to the server side application. The server side application would validate the user information provided using either a database native to the application, or interrogate a directory services application (e.g. LDAP, DNS, etc.). Step 26 checks whether the user information provided is valid the server side application would request the submitter for correct/new information. If the route-to user information is detected in step 27, step 28 provides confirmation of submission-and acceptance of this routing information to the user. As a business application, it would be preferable to create and store in step 29 transaction log and store in step 30 the E-form completed data into a commercial database management system. In our sample implementation 400, the server side application would build in step 31 an email message with a link to the E-form (and it's fill-in data). In the preferred embodiment, the server side application provides a mechanism for notifying users that E-forms are in their queue awaiting action. This may be implemented, such as creating in step 33 an aging timer for each E-form being routed by the server side application. The aging timer can be used to alert users, based on a settable number of days, that an E-form in their queue (routed to this user) has no action after a number of days have passed. At this stage the server side application can send in step 32 email (or other messaging technique) to the first route-to user making the initial form flow submission for this E-form complete in step 34.

Figure 8:
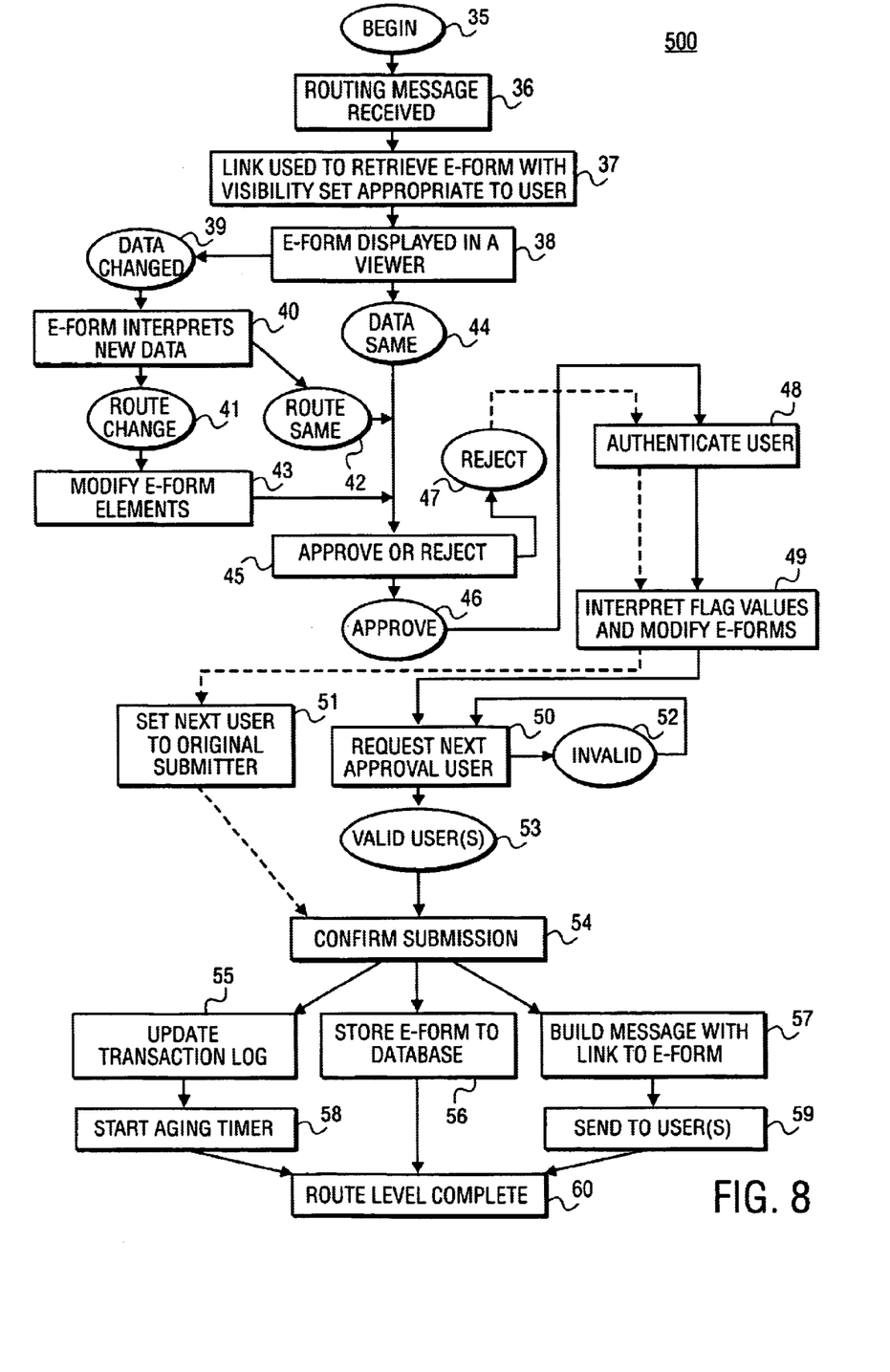
FIG. 8 is a flow diagram of the server side application routing the electronic form to a user for approval or rejection.

FIG. 8 is a flow diagram of the server side application routing the electronic form to a user for approval or rejection process 500. Step 35 begins the first and subsequent user approval process following initial user E-Form submission. In step 36, first approver will receive an email (or notification via some messaging technique) with a link (such as link process 9B of FIG. 4) to E-form with completed data. In step 37, the link to the E-form in this message is then used to request, via HTTP, a copy of the E-form (with completed data) displayed in the approver's browser, and a visibility flag is also set corresponding to signature/approval visual elements for the first approver on E-Form stored to a database on it's initial submission during step 30 of routing process 400 (FIG. 4). In step 38 of FIG. 8, E-form and it's fill-in data is displayed for the first approver. In step 39, upon viewing the filled in E-Form, if the user chooses to modify some fill-in data on the E-form, then in step 40, server side routing process 500 interprets this new data to determine whether to invoke programmatic elements process 9C of FIG. 5 to change the implied routing. Step 41 provides for changing routing if new routing is determined from step 40 and in step 43, E-Form routing is modified accordingly for required subsequent approvals. Then, following step 43, approval routing process converges to step 45 to detect user approval or rejection.

If, however, if the first approver does not submit new changes and data thus remains the same in step 44, the approver may now either approve or reject the E-form in step 45. In the case of rejection, one implementation of the server-side application 500 is to require an authentication step 48 to authenticate the user. Upon verifying the rejecting user, server-side application 500 then in step 49 interprets various flags in E-form based on the rejection to reset the E-form back to step 51 to resubmit the form back to the original submitter of the E-form. In resetting the E-form back to a submitter, the approve and reject buttons would be hidden and a re-submit button could be made visible. The server-side application 500 could then requests in step 54 the rejecting user to confirm this action and on confirmation update the transaction log in step 55 and store E-Form to database in step 56, the changes making this a rejected E-form in the database. An email message, with a link to the reset E-form, is generated in step 57 by the server-side application 500, and that email is sent to the current submitting user in step 57. Server-side application 500 also then resets the aging timer in step 58 since the next user in queue is now changed back to the submitting user. The rejection is now complete, and with the E-form being in a new user's queue (the submitter) the routing level process is then completed in step 60.

Figure 9:
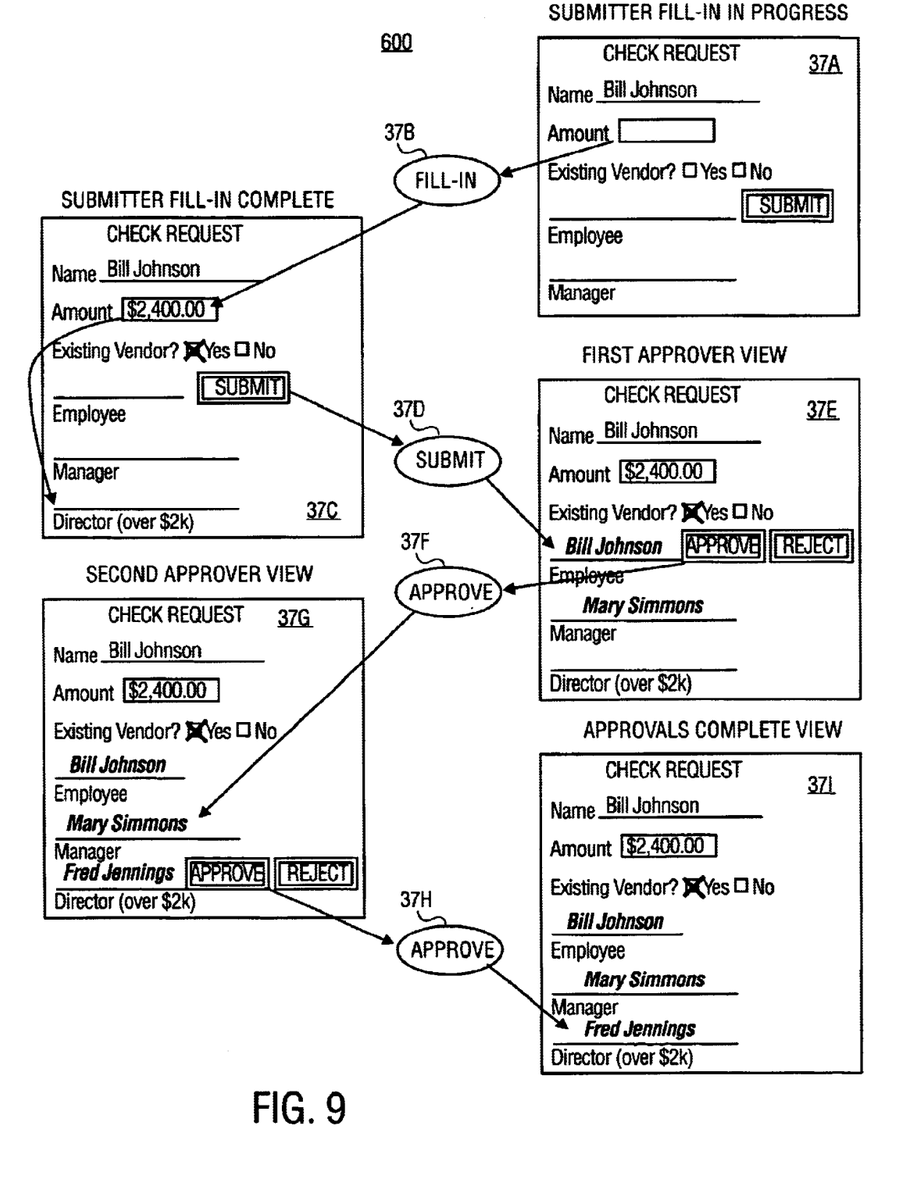
FIG. 9 is an illustration of the main visual aspect of the present invention.

FIG. 9 is an illustration of the main visual aspect of the present invention. Referring back to FIG. 8, in the case of an E-Form approval, such as back in step 46 of routing process 500, server-side application 500 would then authenticate the user in step 48 (FIG. 8). Upon authenticating the approving user, server-side application 500 then interprets various flags in step 49, changing the E-form in step 50 to a state relevant to the next approver in the approval routing stage of the E-form. Corresponding to the original submitter's data completed, values entered in data fields to be interpreted by programmatic elements (such as process 9C of FIG. 4) visually changes E-Form 8G, such as illustrated here in FIG. 9. For example, in prior submitter completed form 37C, signatures/approvals required are then submitted in step 37D to the next approver. In the case of FIG. 9, entry field "Amount" of more than $2k is designed to require an additional required signature/approval of a "Director". As the E-form is submitted in step 37D to the next user, the present invention applies a dated signature proxy for the submitter and provides the first approver with a view of E-form 37E, showing their names on E-form 8, in the location of the signature line within the approval process. One implementation to distinguish users who have completed their action (i.e., Bill Johnson in E-Form 37E) from those being requested some action (i.e., Mary Simmons in step 37E), routing process 500 preferably provides a colored background to the name on the E-form. Server-side application 600 could then request the name of the next approver. The server-side application would validate that the user name provided was valid, such as in step 53 of submission process 500, this might be done by communication with a directory services application. If the user provided was detected in step 52 as invalid, the server-side application 500 would return back to step 50 to request another name or clarification. If the user was determined valid in step 53, server-side application would ask this approver to confirm submission in step 54. This action and confirmation update the transaction log in step 55 and is also stored in step 56, the changes making this a rejected E-form in the database. This approval action step 37F would then set flags within the E-form to signify the approval of the user (colored background applied to Mary Simmons in E-Form 37G). An email message, with a link to the E-form as previously described in step 57 (FIG. 8) is now set to the next approver, and is generated by the server-side application and sent to the user in step 59. The server-side application could also then reset in step 58, the aging timer since the user whose queue the E-form is now in has changed to the next approver. The first approver level is now complete, and with the E-form being in a new users queue (i.e., approver number 2) routing level is then completed in step 60.

As the E-form continues on to more approvers, the same sequence applies where each approver is provided a view of the E-form with their name on the signature line for which their approval is requested. In continuing the example in FIG. 9, approver Fred Jennings goes from viewing the requested action 37G, to view his approval step 37H and approved E-Form 37I. If the E-form's processing is complete one implementation would be to make a visual indication to that effect on the E-form.

The present invention provides for visual and non-visual elements that are contained in an electronic form, of some format, which based on user data input/interaction dynamically changes, the visual appearance of the form. This visual change is accomplished on the client machine and does not rely on communication with a server-side application. The present invention uses these visual changes to the electronic form's anonymous signature lines, labels and messages so as to guide the viewing user on the forms required routing to other users. The present invention therefore provides a method for a self-directed electronic form that supports a self guided routing strategy based on user data input.

Foregoing described embodiments of the invention are provided as illustrations and descriptions. They are not intended to limit the invention to precise form described. In particular, Applicant(s) contemplate that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by Claims following.

What is claimed is:

1. A self-directed routable electronic form generation system to process one or more automated electronic forms, the system comprising:
    a client computer to generate the one or more self-directed routable electronic forms, wherein each automated electronic form includes:
        a plurality of visual elements having text or data fields and graphical elements for receiving user data input for form fill-in; and
        a plurality of non-visual programmatic elements linked to the plurality of visual elements to process the received user data input, wherein the client computer processes the received user data input to automatically change the plurality of visual elements or the plurality of non-visual programmatic elements in response to the received user data input without server intervention; and
    a server remotely coupled to the client computer via a network, wherein a server-side application resident in the server processes the received user data input and determines whether to route the automated electronic form to a particular recipient according to the received user data input, wherein the particular recipient contact information is provided by the user upon request from the server, the server further to determine whether to change routing of the electronic form based on changes introduced into the electronic form by the particular recipient.

2. The self-directed electronic form generation system of claim 1 wherein upon submission of a completed electronic form by a user, the server-side application uses the received user data input provided by the automated electronic form to further query a submitting user to identify one or more subsequent users for further routing of the automated electronic form.

3. The self-directed electronic form generation system of claim 2 wherein the client computer provides the submitting user one or more visual clues on the form for a self directed routing approach.

4. The self-directed electronic form generation system of claim 3, wherein with each successive route by the server-side application to each subsequent user, a form routing path defined by a previous user may be changed by modifying a set of selected elements in a routing of each electronic form itself.

5. The self-directed routable electronic form generation system of claim 1 wherein at least one of the visual elements and the non-visual programmatic elements automatically change based on the user data input.

6. The self-directed routable electronic form generation system of claim 5 wherein portions of the electronic form including at least one of the visual elements and the non-visual programmatic elements is made to be visible as the user data input is entered in previous portions of the electronic form.

7. The self-directed routable electronic form generation of claim 1 wherein at least one of the visual elements and the non-visual programmatic elements is modified to be visual or non-visual based on the received user data input.

8. The self-directed routable electronic form generation system of claim 1 further comprising a plurality of programmable business rules to modify at least one of the visual elements and the non-visual programmatic elements.

9. The self-directed routable electronic form generation system of claim 1 wherein visual elements comprise at least one of a signature line, label, date line, and a date label.

10. The self-directed routable electronic form generation system of claim 9 wherein the user data input is a special identifier corresponding to a signature on the signature line.

11. The self-directed routable electronic form generation system of claim 10 wherein the special identifier is authenticated by an authentication application.

12. The self-directed routable electronic form generation system of claim 10 wherein the special identifier has an attached user identification.

13. The self-directed routable electronic form generation system of claim 10 wherein the special identifier has an attached entity identification.

14. The self-directed routable electronic form generation system of claim 1 wherein the user data input is stored in a database.

15. The self-directed routable electronic form generation system of claim 14 wherein the database also includes transaction history and transaction logs for electronic forms.

16. The self-directed routable electronic form generation system of claim 1 wherein a portion of filtered user data input is stored in a database.

17. The self-directed routable electronic form generation system of claim 1 further comprising a notification sent when the user data input is input into the electronic form.

18. The self-directed routable electronic form generation system of claim 17 wherein the notification comprises an email with a link to the electronic form.

19. The self-directed routable electronic form generation system of claim 1 wherein each electronic form with received user data input is entered into a queue.

20. The self-directed routable electronic form generation system of claim 19 further comprising a timer triggered for timing an electronic form when the electronic form enters the queue.

21. The self-directed routable electronic form generation system of claim 1 wherein each electronic form is a document type selected from the group consisting of: PDF, HTML, XML, MS Word, or GIF.

22. A self-directed routable electronic form comprising:
   a plurality of visual elements including text/data fields and graphical elements for data input and action selection for form fill-in; and
   a plurality of non-visual programmatic elements linked to a set of user data input elements to modify or provide a selection of visual elements, wherein the visual elements and non-visual programmatic elements are modified according to user data input elements independently of a server, and wherein the server determines whether to route the electronic form to a particular recipient based on the user data input elements, wherein the particular recipient contact information is provided by the user upon request from the server, the server further to determine whether to change routing of the electronic form based on changes introduced into the electronic form by the particular recipient.

23. The self-directed routable electronic form of claim 22 wherein each electronic form is a document type selected from the group consisting of: PDF, HTML, XML, MS Word, or GIF.

24. The self-directed routable electronic form of claim 22 wherein at least one of the visual elements and the non-visual programmatic elements is modified to be visual or non-visual based on user data input elements.

25. The self-directed routable electronic form of claim 22 wherein visual elements further comprise at least one of signature lines, labels, date lines, or date labels.

26. The self-directed routable electronic form of claim 22 further comprising a plurality of programmable business rules to modify at least one of the visual elements and the non-visual programmatic elements.

27. The self-directed routable electronic form of claim 22 wherein portions of the electronic form including at least one of the visual elements and the non-visual programmatic elements are made to be visible as user data input elements are entered in previous portions of the electronic form.

28. The self-directed routable electronic form of claim 27 wherein the user data input element is a special identifier corresponding to a signature on the signature line.

29. The self-directed routable electronic form generation process of claim 28 wherein the user data input is a special identifier corresponding to a signature on the signature line.

30. A self-directed routable electronic form generation process comprising:
   generating by a client computer at least one automated electronic form, wherein generating each automated electronic form includes:
      providing a plurality of visual elements having text or data fields and graphical elements for received user data input for form fill-in; and
      providing a plurality of non-visual programmatic elements linked to the plurality of visual elements to process the received user data input,
   wherein the client computer processes the received user data input to automatically change at least one of the visual elements and the non-visual programmatic elements in response to the received user data input without server intervention; and
   providing a server-side application residing on a server to selectively provide the received user data input over the server to another computer, wherein the server-side application processes the received user data input and determines whether to route the automated electronic form to a particular recipient according to the received user data input, wherein the particular recipient contact information is provided by the user upon request from the server, the server further to determine whether to change routing of the electronic form based on changes introduced into the electronic form by the particular recipient.

31. The self-directed routable electronic form generation process of claim 30 wherein upon submission of an automated electronic form by a user, the server-side application processes the received user data input provided by the automated electronic form to further query a submitting user to identify one or more subsequent users for further routing of the automated electronic form.

32. The self-directed routable electronic form generation process of claim 30 wherein visual elements comprise at least one of a signature line, label, date line, and a date label.

33. The self-directed routable electronic process of claim 30 wherein each electronic form is a document type selected from the group consisting of: PDF, HTML, XML, MS Word, or GIF.

* * * * *